Figure 1:
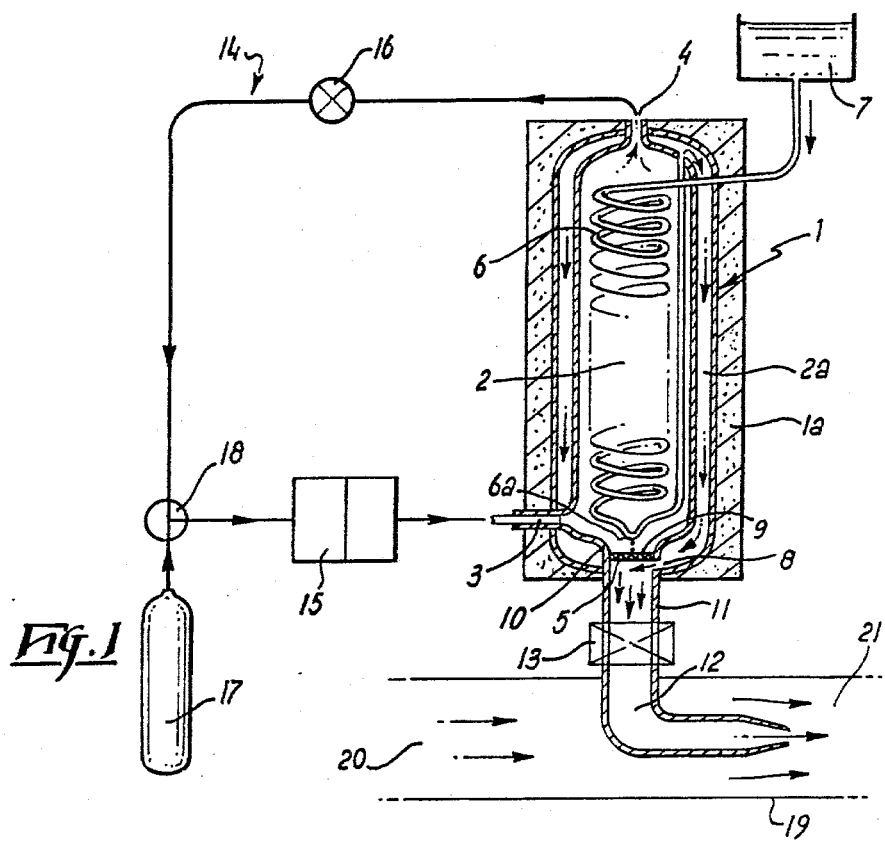

United States Patent [19]

Mann

[11] Patent Number: 4,666,480
[45] Date of Patent: May 19, 1987

[54] SEPARATION OF GASEOUS MIXTURES

[76] Inventor: Reginald Mann, 19 Heath Road, Glossop, Derbyshire SK13 9AY, England

[21] Appl. No.: 716,124

[22] Filed: Mar. 26, 1985

[30] Foreign Application Priority Data

Mar. 27, 1984 [GB] United Kingdom ............... 8407857

[51] Int. Cl.⁴ ............................................. F25J 3/06
[52] U.S. Cl. ........................................ 62/11; 62/40; 62/44; 422/186.11; 422/186.12; 423/581; 210/192; 204/176
[58] Field of Search ............... 62/9, 11, 36, 40, 42, 62/44, 55.5; 55/269, 355; 422/186.11, 186.12; 423/581; 204/176; 210/192

[56] References Cited

U.S. PATENT DOCUMENTS

| | | | |
|---|---|---|---|
| 1,702,683 | 2/1929 | Calude | 62/11 |
| 1,745,730 | 2/1930 | Uhde | 62/11 |
| 2,704,274 | 3/1955 | Allison | 62/40 |
| 2,864,757 | 12/1958 | Balcar et al. | 422/186.12 |
| 3,396,515 | 8/1968 | Wright | 55/269 |
| 3,415,069 | 12/1968 | Hauser | 62/40 |
| 3,921,002 | 11/1975 | Williams et al. | 422/186.11 |
| 4,242,111 | 12/1980 | Arends et al. | 55/269 |
| 4,538,423 | 9/1985 | Le Diouron | 62/55.5 |

FOREIGN PATENT DOCUMENTS

| | | | |
|---|---|---|---|
| 53-34693 | 3/1978 | Japan | 423/581 |
| 54-65163 | 5/1979 | Japan | 55/DIG. 15 |
| 57-14234 | 3/1982 | Japan | 422/186.12 |

Primary Examiner—S. Leon Bashore
Assistant Examiner—Andrew J. Anderson
Attorney, Agent, or Firm—Fisher, Christen & Sabol

[57] ABSTRACT

A gas can be separated by condensation from a gaseous mixture by exposing the mixture to reduced temperature in a chamber having an outlet. The outlet contains a restrictive structure, such as a sintered glass filter disc, on which a thin film of the condensed liquid forms. Liquid is drawn off through the restrictive structure while the film is replenished so that a barrier layer of the liquid which seals the outlet is continuously maintained. The gas may be ozone made from electrical treatment of oxygen and the resulting liquid ozone may be used for water purification.

8 Claims, 2 Drawing Figures

SEPARATION OF GASEOUS MIXTURES

This invention relates to the separation of a gaseous substance from a gaseous mixture and is particularly although not exclusively concerned with the separation of ozone from an ozone/oxygen mixture.

Ozone is an effective large scale water purification agent (e.g. for use with swimming baths or reservoirs) and has the advantage, compared with chlorine, that objectionable tainting of the purified water can be avoided.

However, difficulty has been encountered in producing large quantities of the gas in an economical and convenient manner. In this respect, ozone is customarily produced by passing a continuous stream of air through an electrical generator, the air being pre-dried to avoid interference with the operation of the generator and to prevent the ozone damaging the generator. However, the rate of conversion is typically very low and large volumes of air have to be used to give an adequate quantity of ozone whereby the apparatus required to dry the air is usually large, cumbersome and expensive. Moreover the resulting ozonized air is inconveniently dilute.

An object of the present invention is to provide a convenient and inexpensive method of separating a gaseous substance from a gaseous mixture and which is particularly suited to the separation of ozone from an ozone-containing mixture whereby, for example, the production of large quantities of relatively concentrated ozonized air can be facilitated.

According to one aspect of the invention therefore there is provided a method of separating a gaseous substance from a gaseous mixture, said gaseous substance having a higher condensing temperature than the or each other component of said mixture, and wherein the gaseous mixture is exposed to reduced temperature in a chamber having a liquid outlet thereto, characterized in that said substance is arranged to condense to a liquid which collects in and forms a seal within said outlet, and said liquid is drawn off through said outlet whilst maintaining said seal.

With this arrangement it is possible to effect efficient formation and easy removal of the separated liquid whilst maintaining a closed condensation environment which need not be highly pressurized. Undue wastage of the gaseous mixture and dilution of the separated gaseous substance can therefore be avoided without requiring the use of inconvenient and expensive apparatus.

The method of the invention is particularly suited to the large scale production of ozone. Due to the containment of the gaseous mixture it is feasible to use pure, dry oxygen for conversion to ozone since the unconverted oxygen gas can be retained until converted. Large quantities of ozone can therefore be produced without requiring wasteful throughput of large volumes of gas. Moreover, in so far as pure or highly concentrated ozone is obtained with the method of the invention, this can be utilized admixed with air or otherwise at any desired dilution. Yet further, in so far as air can be admixed with the ozone after formation thereof and immediately before use e.g. for water purification purposes, the air need not be specially pre-dried.

It is however to be understood that the invention is not necessarily restricted to the large scale production of ozone.

In a particularly preferred embodiment the said gaseous mixture is circulated through the said chamber so that the condensed liquid continuously forms and collects in said outlet. The condensed liquid may be drawn off continuously or periodically as desired.

Where the method is applied to the separation of said gaseous substance which is formed by treatment of a gas on a continuous basis with appropriate treatment equipment, e.g. where ozone is formed by continuous flow of oxygen through an electrical generator, the said gaseous mixture may be circulated between said chamber and said treatment equipment with fresh said gas being injected as required continuously or periodically into the circulated mixture.

Where the drawn-off condensed liquid is to be admixed with a carrier gas, as for example in the case where the liquid is ozone and this is to be admixed with air, this may be effected by metered injection of the liquid into a stream of the carrier gas. The liquid may revert to the gaseous phase on meeting the carrier gas or, alternatively, may vaporise as it is drawn off and before it reaches the carrier gas.

According to a second aspect of the present invention there is provided apparatus for use in performing the above method comprising a chamber having an inlet for a gaseous mixture and a liquid outlet, and a source of reduced temperature arranged in communication with the chamber such as to cause a gas in said gaseous mixture to be condensed and delivered to said outlet, characterized in that said outlet is arranged to collect said condensed gas therewithin so as to seal the outlet whilst permitting draw-off of said liquid therethrough.

With regard to the said outlet this preferably comprises a narrow passage across which extends a filter or flow restricting structure, such as a sinter, e.g. a fine glass sinter, an assembly of fine capillary tubes, or the like. Alternatively an open narrow tube or U-tube or any other suitable barrier device may be used.

The outlet may be arranged immediately beneath a source of reduced temperature within said chamber so that the condensed liquid falls from said source, in droplets or as a stream, directly into the said outlet.

This source of reduced temperature may comprise a coil or the like extending into the said chamber and through which a suitable refrigerant is circulated.

The source and/or the chamber may be shaped or constructed to direct condensed liquid into the outlet, e.g. by provision of a downwardly projecting terminal part on the bottom end of the abovementioned coil.

In order to facilitate transfer of condensed liquid through the outlet it is possible to utilize an excess pressure within the chamber and/or to use a wick or capillary or screw drive or other transfer arrangement and/or to flush the outer end of the outlet with a flow of a carrier gas such as dry nitrogen.

The use of excess pressure in the chamber facilitates condensation as well as transfer of liquid through the outlet, and is generally advantageous as long as the pressure is not too great to prevent maintenance of a barrier film or liquid across the outlet. In one embodiment utilizing increased pressure, a piston is movable within the chamber to compress the contents thereof and produce condensed liquid within an outlet. In this case the reduced temperature will be applied externally to the walls of the chamber.

The invention will now be described further by way of example only and with reference to the accompanying drawings FIGS. 1 and 2 of which are diagrammatic representations of alternative forms of apparatus according to the invention.

The apparatus shown in the drawings is for use in the large scale production of ozone for purification of water for example in swimming baths, or for sewage treatment or for any other suitable purpose.

Figure 2:
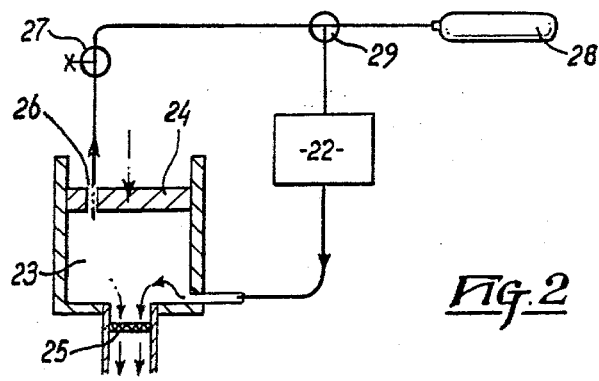

The apparatus of FIG. 1 comprises a condensation vessel 1 defining a thermally insulated chamber 2 having a gas inlet 3, a gas outlet 4 and a liquid outlet 5. The chamber 2 is otherwise sealed and is arranged vertically with the outlet 5 at the bottom, the outlet 4 at the top and the inlet 3 at an intermediate position. A helically coiled refrigeration tube 6 is mounted centrally within the chamber 2 and is connected at its upper end to an insulated reservoir 7 of liquid nitrogen. As shown, the vessel 1 is defined by inner and outer concentric cylindrical bodies. The coil 6 fits closely within the inner body and is connected at its lower end to the annular space 2a between the bodies whereby liquid nitrogen from the reservoir 7 can flow through the coil 6 and from there, as a gas, through the space 2a between the cylindrical bodies of the vesssel 1. The outer cylindrical body is enclosed in suitable insulation material 1a.

The outlet 5 comprises a narrow vertical open-ended tube having a microporous sintered glass disc 9 (40/100 microns) fixed within the tube a short distance below its upper periphery 10. The bottom end 11 of the tube is connected, externally of the vessel, to a delivery pipe 12 via a stop cock 13 and/or metering dvice or other control. The outlet 5 is axially aligned with the coil 6. The lowermost turn of the coil 6 has a central downwardly dircted kink 6a to facilitate dripping as discussed hereinafter. Immediately below the disc 9, the outlet tube 5 is connected via a hole 8 to the space 2a between the cylindrical bodies of the vessel 1.

The inlet 3 and the outlet 4 are connected in a circuit 14 containing an electrical ozone generator 15 of conventional form (disposed immediately before the inlet 3) and a circulation pump 16 (disposed immediately after the outlet 4). A supply of pure, dry oxygen, (e.g. from an oxygen cylinder 17) is connected into the circuit 14 immediately before the ozone generator 15 via a valve 18 which permits simultaneous injection of oxygen and circulation of gas through the circuit 14. The operation of the valve 18 is such as to permit continuous circulation of gas around the system 14 and to allow injection of fresh oxygen from the cylinder 17 only when the pressure in the system 14 falls below a predetermined value.

The delivery pipe 12 is connected to an air feed pipe 19 which draws ambient air in through one end 20 and is connected at its other end 21 to suitable equipment (not shown) for bubbling the air through the water to be purified.

In use, oxygen is fed from the cylinder 17 through the ozone generator 15 to give an ozone/oxygen mixture containing about 2% ozone. This mixture is fed into the chamber 2 and is recirculated via the outlet 4 and the pump 16 to the generator 15. The coil 6 is cooled to say $-160°$ C. and ozone condenses on the coil 6 and drips down into the outlet 5 on top of the sinter plate 9. A layer about 1 mm to 2 mm thick of liquid ozone is allowed to collect on top of the sinter 9 to seal the outlet 5 relative to the external atmosphere. The kink 6a which is immediately above (e.g. 5 mm above) the sinter 9 facilitates the deposition of drips onto the sinter 9.

Once this layer has been formed, ozone is drawn off through the outlet 5 into the pipe 12. This may be achieved, after opening the stop cock 13 or other control, with reliance on gravity assisted if desired by an excess gas pressure in the chamber 2, In the latter respect it will be appreciated that a slight excess pressure can be maintained depending on the restrictive nature of the sinter 9 and can be advantageous to facilitate draw-off of ozone and also to elevate the condensation temperature of the gas. The pressure is however preferably not high enough to necessitate the use of special high pressure apparatus. The hole 8 feeds cool, dry nitrogen gas from the coil 6 to the underside of the sinter 9. This facilitates flushing of the liquid ozone from the sinter 9 into the pipe 12 and also helps prevent moisture passing back from the pipe 19 to the sinter 9.

The liquid ozone vaporises in the outlet 5 as it is drawn off and the gas is mixed with the air in the pipe 19 to give a desired concentration, say 5% to 10% ozone.

After treatment of the water with the ozone-containing air, the water may be passed through active charcoal to remove any excess ozone. The quantity of excess ozone may be monitored and used to control the proportion of ozone injected into the air stream so as to minimize wastage.

The ozone is drawn off at the outlet 5 at a rate corresponding to the rate of condensation so that a sealing film is maintained at all times on the sinter plate 9. The condensation rate is determined by the rate of recirculation through the pump 16 and the proportion of injected oxygen from the cylinder 17. The latter can be adjusted as desired.

With the arrangement described above water purification can be effected in a particularly simple, convenient and inexpensive manner. In particular, it will be noted that the air in the pipe 19 need not be specially dried before use, and the oxygen from which the ozone is produced is contained in a closed system whereby wastage of unused oxygen can be eliminated or at least appreciably reduced.

The gas passed through the ozone generator 15 is strongly cooled due to recirculation from the chamber 2 and this can have the effect of increasing the conversion efficiency of the generator 15.

It is of course to be understood that the invention is not intended to be restricted to the details of the above embodiment which are described by way of example only. Thus, for example, in place of the sinter plate 9 any other suitable permeable filter or other barrier structure may be used. Moreover the ozonized air may be contacted with the water to be purified in any suitable manner not necessarily involving bubbling.

Stiff further, instead of recirculating the oxygen externally through the chamber 2 using the pump 16 it is possible to use an arrangement in which the oxygen is recirculated internally within the chamber past the refrigeration coil 6 e.g. using a fan or the like.

It is visualized that the arrangement specifically described with reference to FIG. 1 will operate in practice such that, after a short start-up with the valve 13 closed, relatively stable conditions are achieved in which the liquefied ozone drips or runs continuously onto the plate 9, a relatively constant slight excess pressure is maintained in the chamber, and the liquefied ozone flows continuously through the plate 9 (so as to vaporize therebeneath as it passes through the open valve 13 onto the pipe 12) under the influence of the pressure difference on opposite sides of the plate. The quantity of liquid ozone accumulating on the plate is therefore relatively insubstantial and constitutes little more than that required to define the seal between the interior and exterior of the chamber.

The efficiency of the cooling arrangement is important to ensure efficient production of ozone. In this respect the vessel 1 should be well insulated and there should be optimum contact between the low temperature source and the gas mixture. Thus, the vessel 1 and coil 6 are preferably arranged to define a small circulation gap alongside the surface of the coil 6. It is also possible to use a heat exchange system which uses structures different from the coil and cylindrical vessel described above. Moreover, instead of using liquid nitrogen in a through-flow system as the coolant it is possible to use a refrigerant which is circulated in a closed system through the coil 6 or other heat exchange structure. Where there is no discharged nitrogen from the cooling system, if desired, a separate source of cool, dry nitrogen may be provided for admission into the outlet 5 to facilitate flushing of the underside of the sinter 9.

With the embodiment of FIG. 1, the liquid ozone accumulates on the sinter 9 and is dispensed at a pressure which is at or slightly higher than atmospheric. With the alternative embodiment of FIG. 2 a more highly pressurized arrangement is used.

As shown, ozonized oxygen from an ozone generator 22 is fed to the cylinder 23 of a piston and cylinder assembly. The piston 24 is raised to admit the ozonized oxygen and is then forced downwardly to compress the gas mixture. The walls of the cylinder 23 are cooled, e.g. with a jacket of liquid nitrogen or refrigerant, and liquid ozone collects on a sinter 25 in an outlet in the bottom of the cylinder 23. During the compression stroke excess gas is vented via an outlet 26 in the piston 24 controlled by a pressure-relief valve 27 and is returned to the generator 22. Fresh oxygen is injected as necessary from a cylinder 28 via a pressure-controlled valve 29. With this arrangement a continuous forced flow of liquid ozone through the sinter 25 can be achieved. The dispensed ozone may be fed into water in like manner to the arrangement of FIG. 1.

Whilst reference is made in the foregoing embodiments to ozone it is possible that the method of the invention may find application in any other context where a gas or gases undergo reaction to produce a product which has a higher condensing temperature than the reagent or reagents. A further example would be the manufacture of ammonia from nitrogen and hydrogen.

I claim:

1. Method of separating a gaseous substance from a gaseous mixture, said gaseous substance having a higher condensing temperature than the or each other component of said mixture, said method comprising the steps of:
    introducing the gaseous mixture into a chamber having a bottom end with a downwardly directed liquid outlet thereon, said outlet having thereacross a plate of porous filtering material having top and bottom surfaces thereto, said top surface of the plate being exposed to the environment within the chamber whereas the bottom surface of the plate is exposed to a different environment externally of said chamber within said outlet;
    cooling said gaseous mixture within said chamber so that said gaseous substance condenses to a liquid which collects on said top surface of said plate so as to form a film which covers said surface and thereby seals said outlet;
    allowing said liquid to percolate downwardly through the film and the plate;
    vaporizing the liquid by exposing the liquid at the bottom surface to said different environment which has a lower pressure, higher temperature or both than said environment within said chamber; and
    drawing off said vaporized liquid beneath the said bottom surface of said plate as said liquid penetrates downwardly from said film through said plate while said film is replenished and said seal is maintained by condensation of further said gaseous mixture in said chamber.

2. The method according to claim 1 further including the steps of:
    continuously removing uncondensed said gaseous mixture from said chamber;
    continuously recirculating said removed gaseous mixture back into said chamber; and
    continuously drawing off said vaporized liquid at said outlet.

3. The method according to claim 2 further including the steps of:
    continuously treating a gas with treatment equipment to form said gaseous substance therefrom:
    recirculating said removed gaseous mixture via said treatment equipment back to said chamber; and
    injecting fresh said gas into said removed gaseous mixture before said treatment equipment.

4. The method according to claim 1 further including the step of admixing the drawn-off vaporized liquid with a carrier gas by metered injection of the vaporized liquid into a stream of the carrier gas.

5. The method according to claim 1 wherein said gaseous substance is ozone.

6. Apparatus for use in separating a gaseous substance from a gaseous mixture, said gaseous substance having a higher condensing temperature than the or each other component of said mixture, said apparatus comprising:
    a chamber having a bottom end with a downwardly directed liquid outlet therein and an inlet for said gaseous mixture above said outlet;
    a microporous sintered glass plate extending across said outlet, said plate having an upwardly directed top surface exposed to the environment within said chamber and a downwardly directed bottom surface exposed to a different environment externally of said chamber, said different environment having a lower pressure, higher temperature or both than the environment within said chamber;
    a draw-off passage connected to said outlet adjacent the bottom surface of said plate;
    a source of reduced temperature disposed over said top surface of said plate in said chamber so as to condense said gaseous substance within said chamber to form liquid which drips directly on said top surface of said plate to form a film thereon which covers said top surface and seals said outlet, said plate constituting means for vaporizing said liquid, said liquid penetrating downwardly from said film through said plate, and the liquid exposed at the bottom surface of said plate to said different environment vaporizing; and means for drawing off said vaporized liquid through said draw-off passage.

7. Apparatus according to claim 6 wherein the said source of reduced temperature comprises a coiled tube through which a refrigerant flows.

8. Apparatus according to claim 6 further including:
a gaseous mixture outlet in said chamber above said liquid outlet;
treatment equipment for treating a gas to form said gaseous substance;
a circulation circuit including a circulation pump which connects said gaseous mixture inlet to said gaseous mixture outlet via said treatment equipment; and
a source of said gas connected to said circulation circuit before said treatment equipment.

* * * * *